US010875030B2

(12) United States Patent
Fetter (10) Patent No.: US 10,875,030 B2
(45) Date of Patent: Dec. 29, 2020

(54) VACUUM-ASSISTED PELLETIZER (71) Applicant: Bay Plastics Machinery Company LLC, Bay City, MI (US)

(72) Inventor: Richard H. Fetter, Bay City, MI (US)

(73) Assignee: BAY PLASTICS MACHINERY COMPANY LLC, Bay City, MI (US)

( * ) Notice: Subject to any disclaimer, the term of this patent is extended or adjusted under 35 U.S.C. 154(b) by 0 days.

(21) Appl. No.: 16/775,487

(22) Filed: Jan. 29, 2020

(65) Prior Publication Data

US 2020/0164380 A1 May 28, 2020

Related U.S. Application Data (62) Division of application No. 14/674,333, filed on Mar. 31, 2015, now Pat. No. 10,589,283.

(51) Int. Cl.
| | |
|---|---|
| B02C 18/22 | (2006.01) |
| B29B 9/06 | (2006.01) |
| B29B 9/16 | (2006.01) |
| B02C 18/08 | (2006.01) |
| B02C 23/30 | (2006.01) |
| B02C 23/26 | (2006.01) |

(52) U.S. Cl.
CPC ........ B02C 18/2216 (2013.01); B02C 18/086 (2013.01); B02C 18/2291 (2013.01); B02C 23/26 (2013.01); B02C 23/30 (2013.01); B29B 9/06 (2013.01); B29B 9/16 (2013.01)

(58) Field of Classification Search
CPC ......... B29B 9/06; B29B 9/16; B02C 18/2216; B02C 18/086; B02C 18/2291
See application file for complete search history.

(56) References Cited

U.S. PATENT DOCUMENTS

| | | | |
|---|---|---|---|
| 2,719,336 A | 10/1955 | Stotler | |
| 4,243,181 A | 1/1981 | Hench | |
| 4,632,752 A | 12/1986 | Hunke | |
| 4,850,835 A | 7/1989 | Rudolph | |
| 5,248,100 A * | 9/1993 | Arakawa | ............... B02C 18/142 241/34 |
| 5,265,507 A | 11/1993 | Noda et al. | |
| 5,628,947 A | 5/1997 | Keilert | |
| 6,039,905 A | 3/2000 | Zollitsch et al. | |
| 7,124,972 B2 | 10/2006 | Fetter et al. | |
| 7,393,201 B2 | 7/2008 | Fetter et al. | |

(Continued)

FOREIGN PATENT DOCUMENTS

| | | | |
|---|---|---|---|
| EP | 0412004 | 2/1991 | |
| GB | 1200667 | 7/1970 | |
| GB | 1200667 A * | 7/1970 | ........... B29C 48/911 |

Primary Examiner — Seyed Masoud Malekzadeh
(74) Attorney, Agent, or Firm — Warner Norcross + Judd LLP (57) ABSTRACT A thermoplastic pelletizer providing enhanced pellet yields with reduced fines contamination. The pelletizer includes a cutting rotor and a feed assembly for feeding plastic to the cutting rotor. The pelletizer further includes two chutes—a first chute arranged to collect pellets, and a second chute arranged to collect fines. A vacuum is drawn on both chutes to assist in the collection of both pellets and fines in their respective chutes. Compressed air is directed past the cutting rotor to the first chute to assist in moving pellets from the cutting rotor to the first chute.

6 Claims, 6 Drawing Sheets (56) References Cited

U.S. PATENT DOCUMENTS

| | | |
|---|---|---|
| 2012/0205833 A1 | 8/2012 | Martin et al. |
| 2014/0186477 A1 | 7/2014 | Dell'Orco et al. |
| 2016/0346981 A1 | 12/2016 | Lipscomb |

* cited by examiner

VACUUM-ASSISTED PELLETIZER

BACKGROUND OF THE INVENTION

The present invention relates to pelletizers for thermoplastics, other plastics, and other materials.

Pelletizers for thermoplastics, other plastics, and other materials are well known to those skilled in the art. Pelletizers typically include a chamber, a rotating cutter within the chamber, a feed mechanism, and a collection chute. The feed mechanism delivers the thermoplastic to the rotating cutter, which cuts the thermoplastic into pellets which are collected in the collection chute. Examples of such technology may be seen, for example, in U.S. Pat. No. 7,124,972 dated Oct. 24, 2006 and U.S. Pat. No. 7,393,201 dated Jul. 1, 2008, both to Fetter.

Pelletizers are designed so that the vast majority of the pellets created by the cutting rotor travel directly into the collection chute. However, some of the pellets will circulate within the cutting chamber to come into contact with the rotating cutter once again. Sometimes this happens multiple times. This process is called "double cutting", and it results in the creation of undesirable "fines". Ultimately, the fines leave the cutting chamber through the collection chute. Because pellets of a uniform size are desired, the fines are essentially "contaminants". Fines reduce the "yield", the quality, and the value of the pelletized product.

SUMMARY OF THE INVENTION

The present invention addresses the aforementioned problem by providing both improved separation of pellets and fines and improved capture of fines from the chamber.

More particularly, the pelletizer includes a chamber, a rotating cutter within the chamber, a feed mechanism for delivering thermoplastic to the cutter, and a discharge chute. The chamber, the cutter, and the feed mechanism are conventional in the art. The discharge chute is new. The chute includes a pellet section and a fines section. The pellet chute section is arranged to receive primarily pellets, and the fines chute section is arranged to receive primarily fines. Preferably the pellet chute section is adapted to be connected to a vacuum, and more preferably both chute sections are adapted to be connected to a vacuum. In the latter case, the vacuums may be the same or different.

By providing the separate collection of pellets and fines, the yield of accurately sized pellets is improved, and the contamination by fines is reduced.

In the current embodiment, the chute further includes a divider plate between the chute sections. The divider plate separates the mouths of the two chute sections and extends from the mouths of the chute sections toward the rotor. The divider plate can extend more than half of the distance between the mouths and the rotor. The divider plate can extend to a position closely proximate the rotor.

The divider plate further provides for the separation of pellets and fines, which even further improves uniformly sized pellets (i.e. the yield of the product). When either or both of the chute sections are connected to a vacuum, the divider plate improves the vacuum effect on the pellets leaving the cutter. The divider plate also directs pellets into the first discharge chute.

As further disclosed in the current embodiment, the pelletizer may include a compressed air inlet that directs compressed air past the cutting rotor and to the mouth of the first discharge chute. The compressed air assists in moving the pellets from the cutter and into the pellet chute section.

These and other advantages and features of the invention will be more fully understood and appreciated by reference to the description of the current embodiment and the drawings.

DESCRIPTION OF THE CURRENT EMBODIMENT

Figure 1:
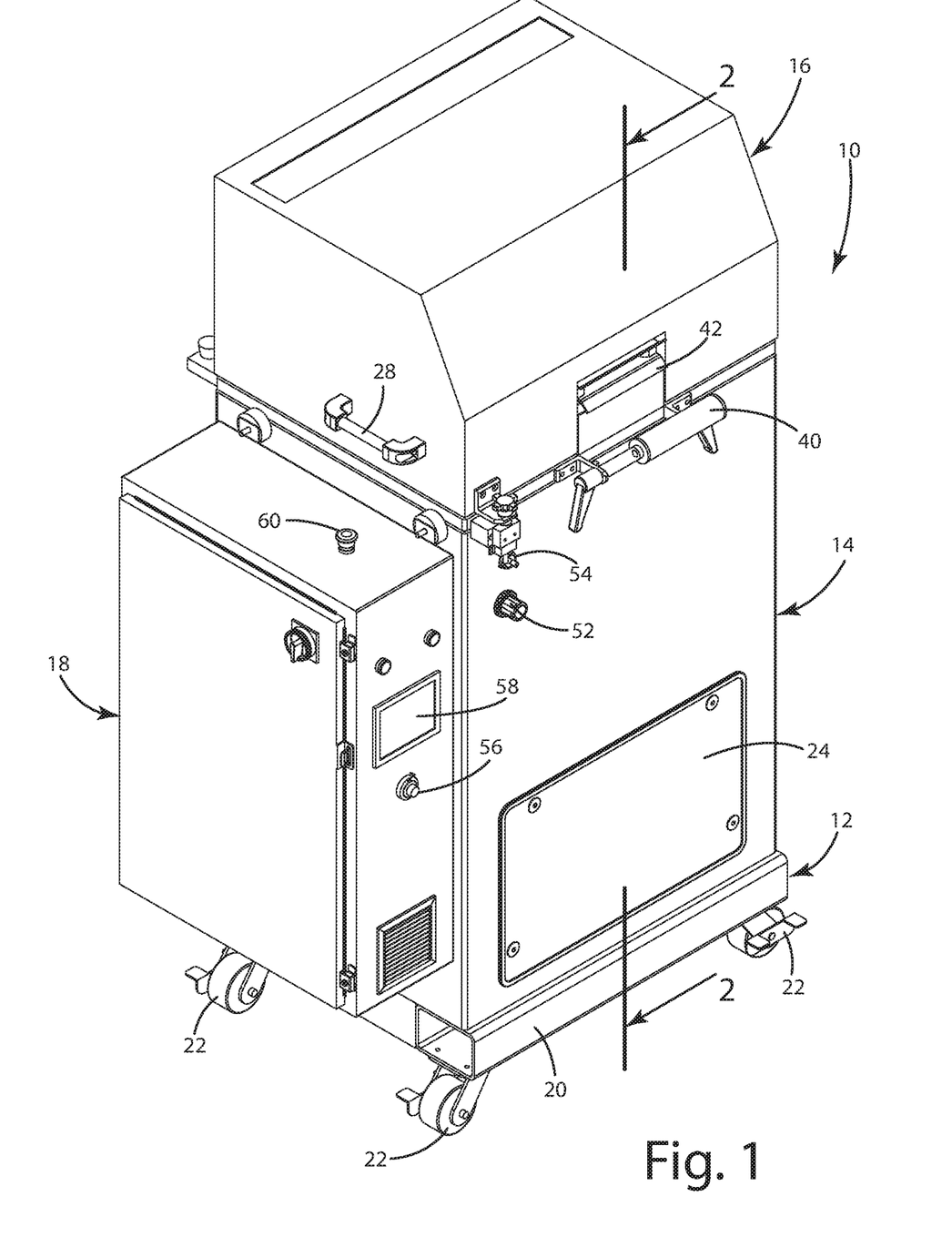
FIG. 1 is a perspective view of a pelletizer constructed in accordance with a current embodiment of the invention.
Figure 2:
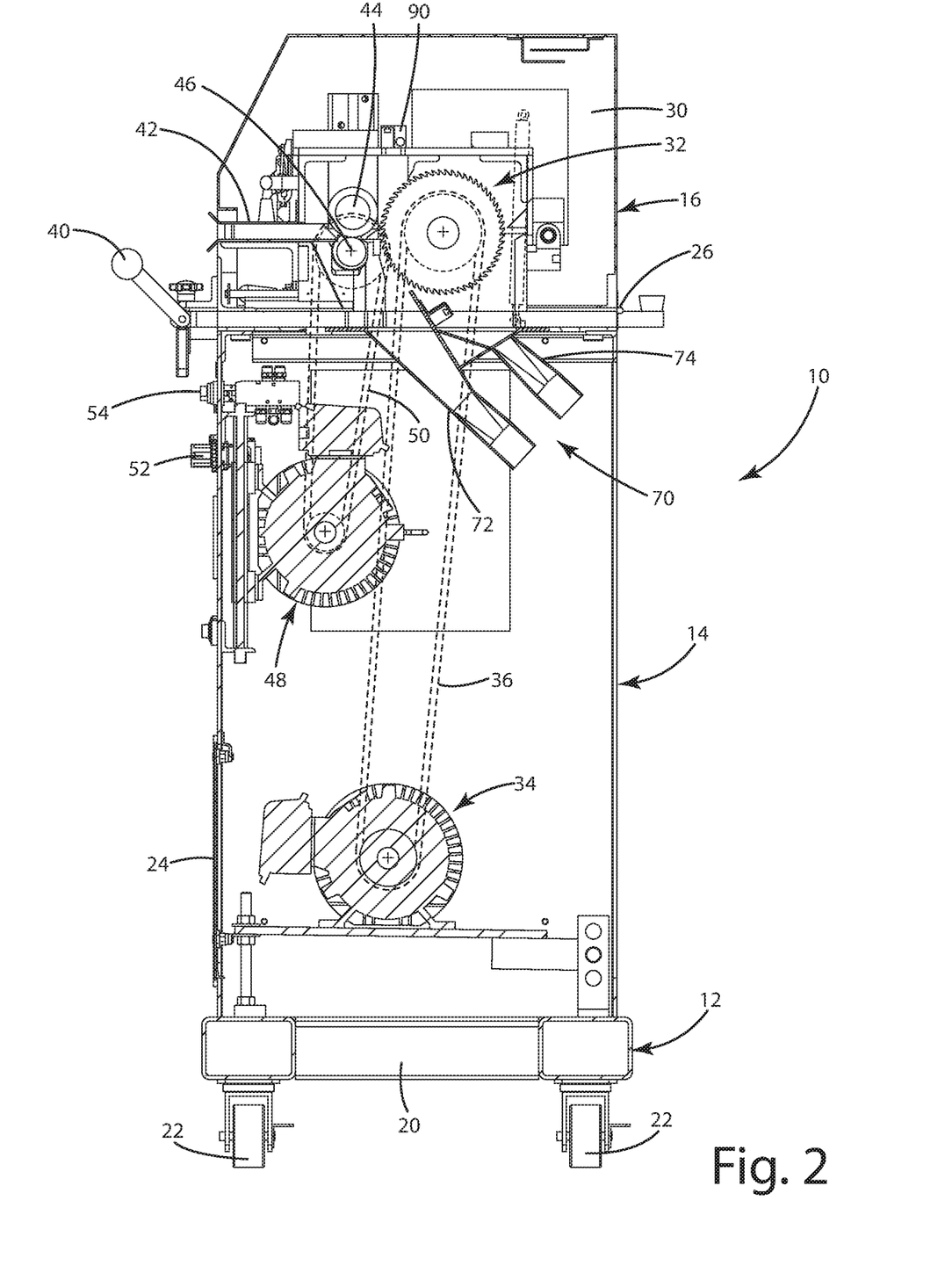
FIG. 2 is a sectional view taken along line 2-2 in FIG. 1.
Figure 3:
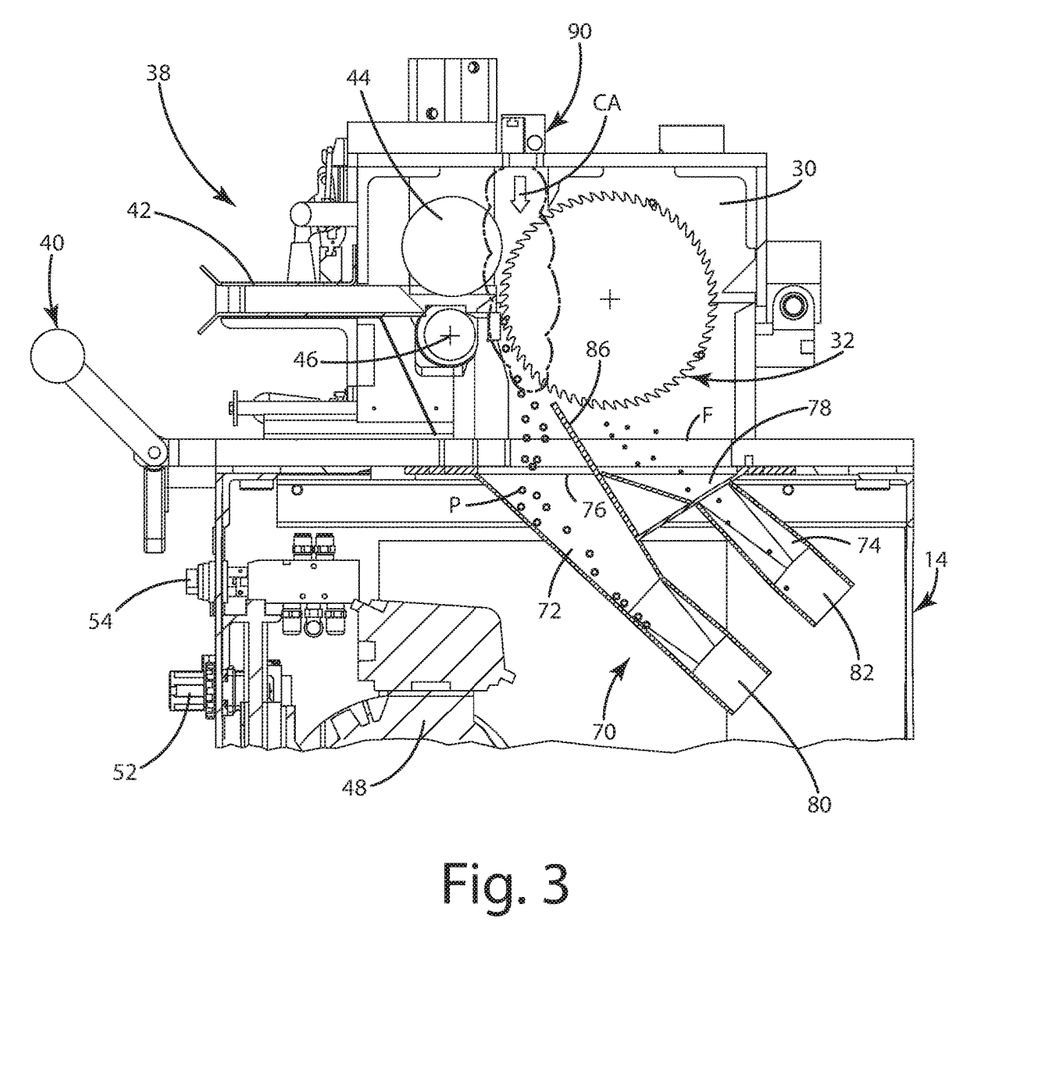
FIG. 3 is an enlarged sectional view of the upper portion of FIG. 2 with the hood removed.

A pelletizer constructed in accordance with a current embodiment of the invention is illustrated in the drawings and generally designated 10. Referring initially to FIGS. 1-3, the pelletizer 10 includes a base assembly 12, a housing assembly 14, a hood 16, and a control box 18. The housing 14 is supported on the base assembly 12, and the hood 16 and the control box 18 are supported on the housing 14.

The base assembly 12 is of conventional design and includes a frame 20 supported by a plurality of casters 22. The base assembly 12 supports the remainder of the pelletizer 10.

The housing 14 is also of conventional design and provides an enclosure for various pelletizer components to be described. The housing 14 includes an access panel 24 providing access to components within the housing.

The hood 16 is hingedly supported on the housing 14 by way of hinges 26. The hood may be moved between a closed position (illustrated in the drawings) and an open position in which the lid is lifted. The lid 16 includes handles 28 on its opposite sides to facilitate movement of the lid between its open and closed positions. The hood 16, together with the discharge assembly to be described, defines a cutting chamber 30.

A cutting rotor 32 is located within the chamber 30. In the current embodiment, the cutting rotor is a 60-tooth Stellite rotor assembly, including a smooth lower feed roll 46 and a Hypalon upper feed roll 44. Alternatively, the rotor 32 could be any suitable rotor known to those skilled in the art. The cutting rotor 32 rotates in a counterclockwise direction as viewed in FIGS. 2-3. Accordingly, the teeth move downwardly through the thermoplastic or other material as the thermoplastic or other material is fed to the cutting rotor 32. In the current embodiment, the cutting rotor 32 rotates at a speed of 1000 revolutions per minute (RPM), and the thermoplastic or other material is fed to the cutting rotor 32 at a speed of 270 feet per minute (FPM). Of course, the speed of the rotor and the feed speed of the feed mechanism 38 may be adjusted as will be recognized by those skilled in the art in view of the material being cut, the desired pellet size, and other parameters.

A rotor drive 34 is supported within the housing 14 and is operatively connected to the cutting rotor 32 by way of the belt 36. In the current embodiment, the rotor drive 34 is a 15 horsepower (hp) 460/3/60 electric motor. Other suitable rotor drives and drive/rotor connecting devices will be known to those skilled in the art.

A feed assembly 38 includes a strand comb 40, a guide 42, an upper feed roll 44, and a lower feed roll 46. The strand comb 40 supports and guides thermoplastic strands (not shown) or other material strands into the remainder of the feed assembly 38. The guide 42 directs the strands from the comb 42 to the feed rolls 44 and 46. The strands are grabbed and propelled by the rolls 46 and 44 to be delivered to the cutting rotor 32. The upper feed roll 44 is biased into engagement with the lower feed roll 46, for example, using springs, compressed air, or other suitable arrangement.

A feed roll drive 48 is supported within the housing 14. In the current embodiment, the feed drive 48 is a 2 hp 460/3/60 electric motor. The feed drive 48 is operatively connected to the lower feed roll 46 by way of the belt 50. Consequently, the lower feed roll 46 is driven by the feed drive 48. Other suitable feed drives and drive/feed connections will be known to those skilled in the art.

The control box 18 houses a control system (not illustrated) that controls the operation of the pelletizer 10. The construction, interconnections, and operation of the control system will be readily understood and easily implemented by those skilled in the art in view of this specification. A feed roll regulator 52 and a feed roll switch 54 are provided on the front of the housing 14 in conventional fashion. A line speed regulator 56 is provided on the front of the control box 18 and provides a means of adjusting the line speed. A display 58 also is provided on the front of the control box 18 to display the line speed and the resulting pellet length. A stop button 60 is provided on the top of the control box 18 as an emergency stop button.

The pelletizer components as thus far described are generally of conventional design as will be recognized by those skilled in the art.

A discharge chute or chute assembly 70 is supported within the upper portion of the housing 14 and defines the lower portion of the cutting chamber 30. The chute assembly 70 is shown in greater detail in FIGS. 4-6. The assembly 70 includes a first or pellet chute section 72 and a second or fines chute section 74. The chute sections 72 and 74 include mouths 76 and 78, respectively, at their upper ends.

Figure 4:
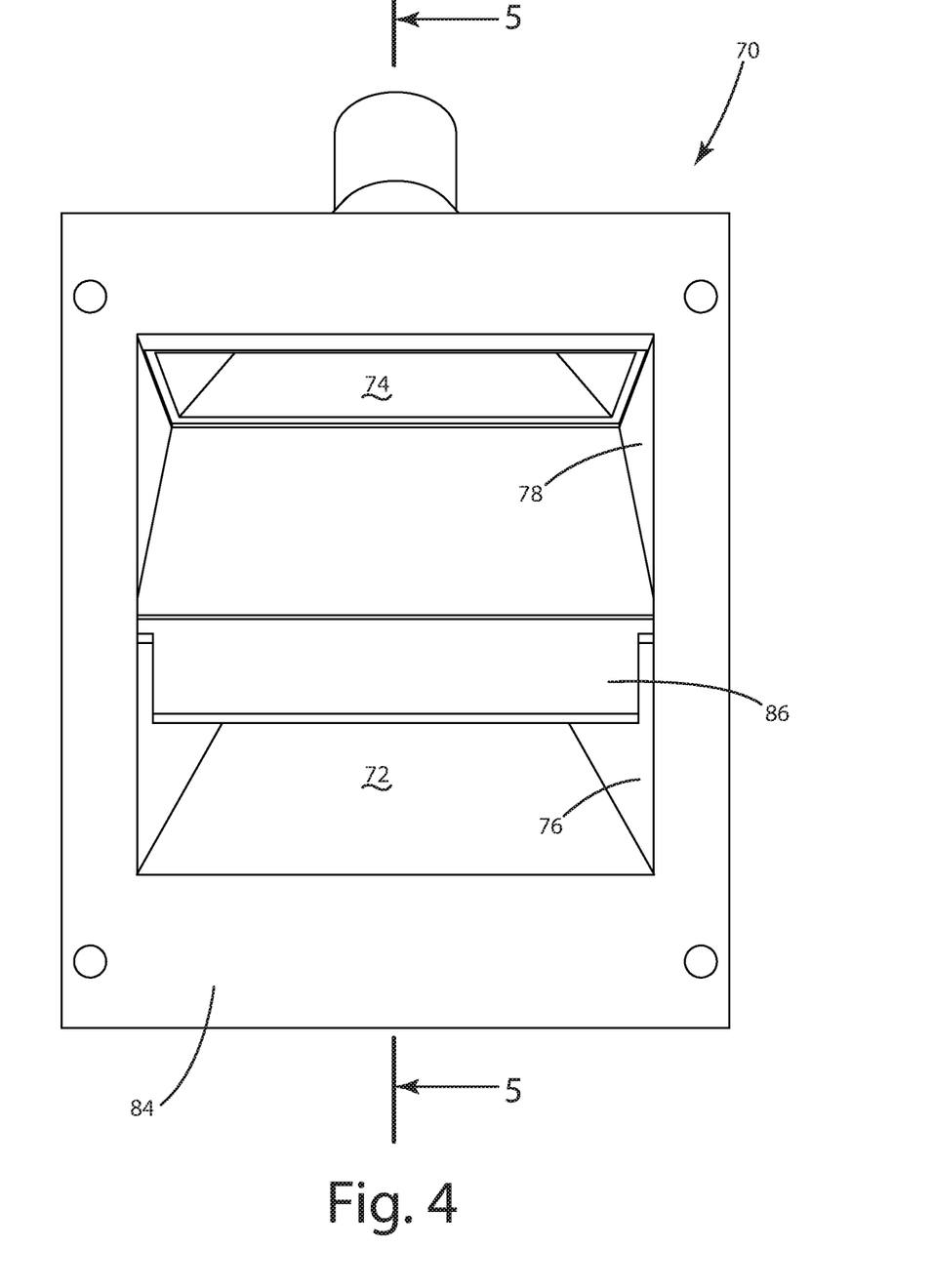
FIG. 4 is a top plan view of the discharge chute.
Figure 5:
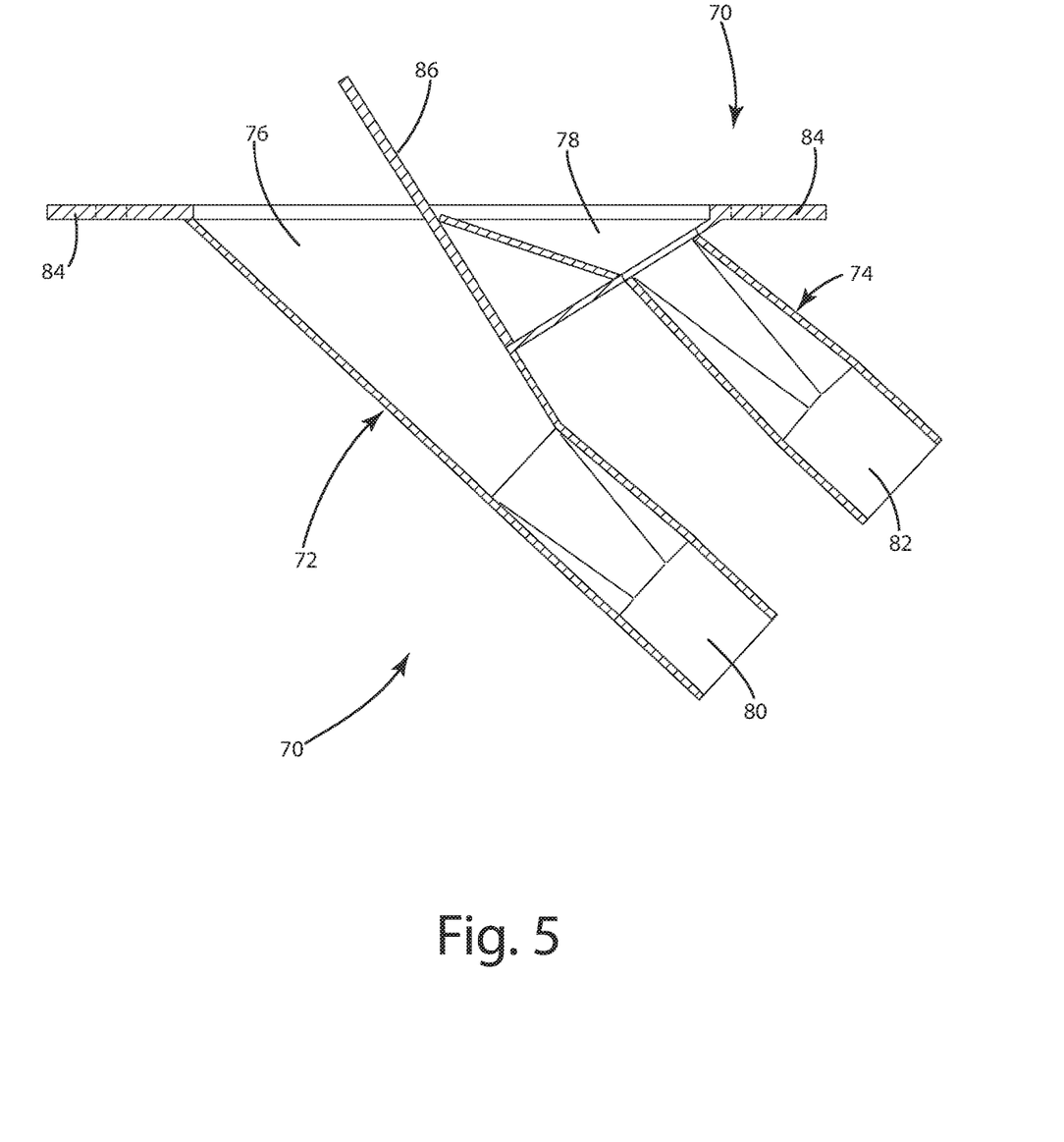
FIG. 5 is a sectional view taken along line 5-5 in FIG. 4.
Figure 6:
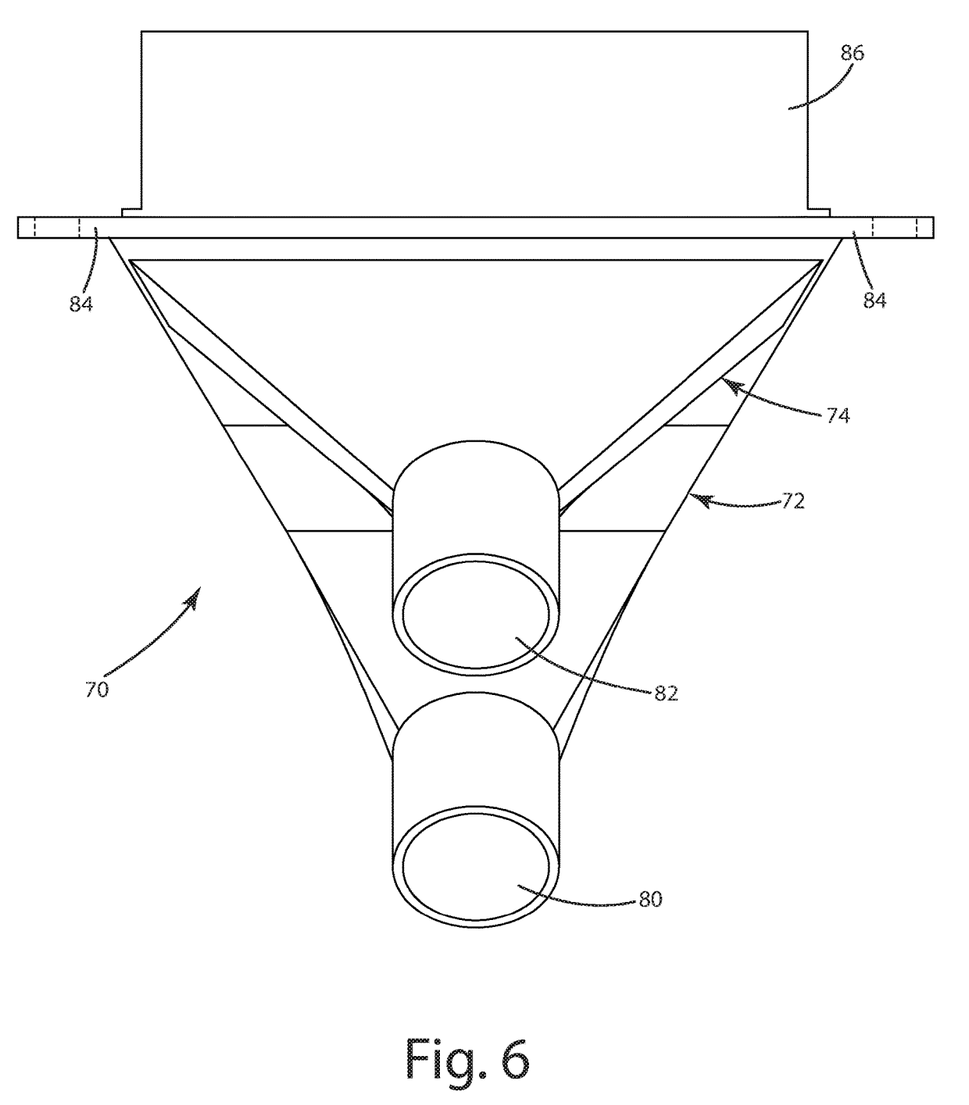
FIG. 6 is an end elevational view of the discharge chute.

The chute sections 72 and 74 include hose connections 80 and 82, respectively. In the current embodiment, the connections 80 and 82 are sized for connection to a 2-inch hose. The hose connections 80 and 82 are adapted for connection to a source of vacuum. As contemplated in the current embodiment, the connections 80 and 82 are connected to the same (i.e. a common) vacuum source, which can draw a vacuum, and therefore airflow, through the chutes 72 and 74. Alternatively, the connections 80 and 82 may be connected to different vacuum sources, or only one of the connections may be connected to a vacuum source. When provided, the vacuum and air movement assist in drawing pellets and fines out of the chamber and through the chute sections 72 and 74. The size of the hose connections as well as all other dimensions within the chute assembly may vary depending on the application. Preferably, the airflow velocity through the pellet chute section 72 is greater than the peripheral velocity of the cutting rotor 32, and therefore greater than the velocity of pellets coming off the cutting rotor.

The assembly 70 includes a mounting flange 84 for attaching the assembly to the housing 14.

The discharge chute assembly 70 may include a divider plate 86 separating the mouths 76 and 78. As perhaps best seen in FIG. 3, the divider plate 86 extends from the mouths 76 and 78 toward the cutting rotor 32. As illustrated, the divider plate 86 extends more than half of the distance between the mouths 76 and 78 and the cutting rotor 32. Indeed, as illustrated, the divider plate 86 extends to a position closely proximate the cutting rotor 32. The close proximity of the divider plate 86 to the cutting rotor 32 provides two advantages. First, the proximity of the divider plate increases the vacuum effect on the pellets exiting the cutter. Second, the proximity of the divider plate improves the physical deflection of the pellets into the first chute 72.

As perhaps best illustrated in FIG. 3, the first and second chute sections 72 and 74 are arranged to collect primarily pellets and fines, respectively. The mouth 76 of the chute section 72 is aligned with the cutting area so that the pellets P exit the cutting area and pass into the chute section 72. The divider plate 86, especially when it is positioned closely proximate to the cutter 32, assists in directing the pellets into the chute section 72. Further, because the pellets P have a greater mass than the fines F, the pellets have momentum from the cutting area that causes them to pass into the chute section 72 through the mouth 76. The fines, because of their lesser mass, tend to exit the cutter teeth more slowly, often after the fines have passed the divider plate 86. Consequently, the fines pass into the chute section 74 through the mouth 78. The vacuums drawn on the chute sections 72 and 74 create an airflow that assists with the travel of the pellets P into the chute section 72 and the fines F into the chute section 74. Only a small proportion of the pellets P and fines remain in the chamber 34 to potentially be double cut by the cutting rotor 32.

The pelletizer 10 may additionally include a nozzle 90 or other means of directing compressed air CA into the chamber 30. When included, the nozzle 90 directs the compressed air CA through the cutting area, across or past the cutting rotor 32, and toward the mouth 76 of the chute 72. The compressed air CA facilitates the movement of the pellets P from the cutting rotor 32 into the chute 72. The compressed air CA thereby further enhances the separation of pellets P and fines F. The nozzle 90 may be connected to a source (not illustrated) of compressed air in a manner known to those skilled in the art.

Additionally, the pelletizer 10 may include an ion emitter or other source of ions (not illustrated) to introduce ions into the cutting chamber 32 and/or into the chute assembly 70 to improve the movement of pellets P and fines F as described. Such ion emitters are known to those skilled in the art.

As will be appreciated from the above description, the pelletizer 10 including the novel discharge chute assembly 70 provides a distinctly improved yield of uniformly sized pellets P. The contamination of the pellets P by fines F is distinctly reduced. Consequently, the pellets P have enhanced consistency and value.

The above description is that of a current embodiment of the invention. Various alterations and changes can be made without departing from the spirit and broader aspects of the invention as defined in the appended claims, which are to be interpreted in accordance with the principles of patent law including the doctrine of equivalents.

This disclosure is presented for illustrative purposes and should not be interpreted as an exhaustive description of all embodiments of the invention or to limit the scope of the claims to the specific elements illustrated or described in connection with these embodiments. For example, and without limitation, any individual element of the described invention may be replaced by one or more alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative.

The invention is not limited to the details of operation or to the details of construction and the arrangement of the components set forth in the above description or illustrated in the drawings. The invention may be implemented in various other embodiments and practiced or carried out in alternative ways not expressly disclosed herein. Also, the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

The disclosed embodiment includes a plurality of features that are described in concert and that might cooperatively provide a collection of benefits. The present invention is not limited to only those embodiments that include all of these features or that provide all of the stated benefits.

Any reference to claim elements in the singular, for example, using the articles "a," "an," "the" or "said," is not to be construed as limiting the element to the singular. Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation.

The embodiments of the invention in which an exclusive property or privilege is claimed are defined as follows:

1. A method of pelletizing plastic strands comprising the steps of:
   providing a cutting chamber having a cutting area;
   providing a rotatable cutting rotor within the cutting chamber with a cutting periphery of the cutting rotor in the cutting area;
   rotating the cutting rotor;
   feeding the plastic strands into the cutting chamber and to the periphery of the cutting rotor within the cutting area, thereby creating pellets that have been cut a single time by the cutting rotor and fines that have been cut a plurality of times by the cutting rotor;
   providing first and second discharge chute sections that communicate with the cutting chamber, the first discharge chute section aligned with the cutting area and configured to receive the pellets, the second discharge chute section unaligned with the cutting area and configured to receive the fines;
   operatively connecting the first and second discharge chute sections to a vacuum source;
   collecting the pellets in the first discharge chute section; and
   collecting the fines in the second discharge chute section.

2. A method as defined in claim 1 further comprising:
   providing a divider plate separating first and second mouths of the first and second discharge chute sections respectively, the divider plate extending from the first and second mouths of the first and second discharge chute sections toward the cutting rotor.

3. A method as defined in claim 2 wherein the divider plate extends more than halfway of a distance from the first and second mouths of the first and second discharge chute sections to the cutting rotor.

4. A method as defined in claim 3 wherein the divider plate extends to a position proximate the cutting rotor.

5. A method as defined in claim 1 further comprising:
   directing compressed air past the cutting rotor to a first mouth of the first discharge chute section to assist in moving the pellets from the rotor into the first discharge chute section.

6. A method as defined in claim 1 wherein the plastic strands comprise thermoplastic strands.

* * * * *